United States Patent [19]

Rawlings

[11] 3,839,016
[45] Oct. 1, 1974

[54] METHOD FOR MELTING SCRAP METALS
[75] Inventor: Robert K. Rawlings, Maumee, Ohio
[73] Assignee: U.S. Reduction Co., East Chicago, Ind.
[22] Filed: Aug. 28, 1972
[21] Appl. No.: 284,244

[52] U.S. Cl. .................. 75/43, 75/44 S, 75/65, 266/33 S
[51] Int. Cl. ............................................. C21b 1/00
[58] Field of Search .............. 75/43, 44 R, 44 S, 65; 266/16, 33 S; 201/11

[56] References Cited
UNITED STATES PATENTS
3,645,516  2/1972  Turpin ................................ 266/16

Primary Examiner—L. Dewayne Rutledge
Assistant Examiner—M. J. Andrews
Attorney, Agent, or Firm—Dressler, Goldsmith, Clement & Gordon, Ltd.

[57] ABSTRACT

Metallic scrap contaminated with combustibles is melted in a well-type furnace to recover the metallic component with the aid of preheated air and heat generated by burning the fumes generated by the combustible contaminants. The scrap is fed into a depository well which communicates with a main furnace well under a combustion chamber in which burners are operated. Melting heat is transmitted through the molten material within the wells to the incoming scrap within the depository well to maintain its temperature at a level sufficient to melt the scrap and both significantly, heat the air above the depository well and vaporize the combustibles. A negative pressure is maintained above the depository well by a hood covering the depository well thus preventing the escape of fumes but admitting air. The hood communicates with a duct system which incorporates a blower and leads to the burners. The fumes and air from the depository well are thereby directed into the burners, which ignite and burn the same; sometimes with conventional fuel such as natural gas, the latter being needed in only a reduced amount.

7 Claims, 2 Drawing Figures

METHOD FOR MELTING SCRAP METALS

BACKGROUND OF THE INVENTION

The present invention relates generally to the reclaiming of metal from by-products and scrap, and more particularly, to an improved well-type melting furnace and process for use therewith.

In the recovery of metals from scrap materials, some of the greatest problems have been presented by scrap contaminated with combustibles, particularly hydrocarbons, such as oil, paint, grease and the like. Such hydrocarbon-contaminated materials have required rather elaborate processing to drive off by vaporization as much of the hydrocarbon contaminant as possible while avoiding oxidation of the metal, which would decrease recovery. The processing of such scrap results in production of fully or partially unburned hydrocarbon-bearing fumes which previously were wasted and which added a further problem of pollution. A superior solution to these problems for rotary furnaces, involving in situ utilization of the combustible vapors as fuel for the melting process, has been set forth in the copending application of Robert G. Snyder, et al., "Method of Reclaiming Metal from Scrap Materials," Ser. No. 59,640, filed 7/30/70, and assigned to the same assignee as the present invention, now abandoned.

The well-type melting furnace which is often used for such recovery operations has presented certain additional problems peculiar to its own design. Such a well-type furnace consists of a vertically-extending central heating chamber over a well which extends horizontally both within and on at least one side thereof, outside the heating chamber. The outside well portion of the furnace normally has been open to permit fumes of unburned hydrocarbons and other combustibles to escape and dissipate in the surrounding atmosphere. Due to the design of the furnace, it has been proven difficult to dispose of such fumes without disturbing its operation.

SUMMARY OF THE INVENTION

The present invention provides an improved well-type melting furnace for reclaiming metals from metallic scrap material contaminated with combustibles. It includes a large well which is operatively divided into two communicating wells: one being the receiving well for scrap material during melting and the other being the main holding well for molten metal. A combustion chamber, defined over the main holding well, is equipped with a burner secured within the input opening of the combustion chamber to provide the heat for melting and treating the scrap material. Heat from molten material flowing between the holding well and the scrap receiving well produces combustible fumes by vaporizing the combustibles of the scrap material, and significantly preheats the air above the scrap receiving well. A vaporization chamber defined over the scrap receiving well has an exhaust opening and duct means connecting the same with the burner. The vaporization chamber collects the fumes and preheated air for ignition at the burner in the combustion chamber. In this manner the vaporized combustibles generated by scrap material in the receiving well are prevented from escaping and are utilized in the melting process. Since the combustible fumes are thus utilized and the combustion air is preheated, the efficiency of the furnace is markedly increased and the requirements of the furnace for conventional fuels are significantly reduced. At the same time the exhaust of combustible fumes and air pollutants from the combustion chamber of the furnace is substantially eliminated.

DETAILED DESCRIPTION

Figure 1:
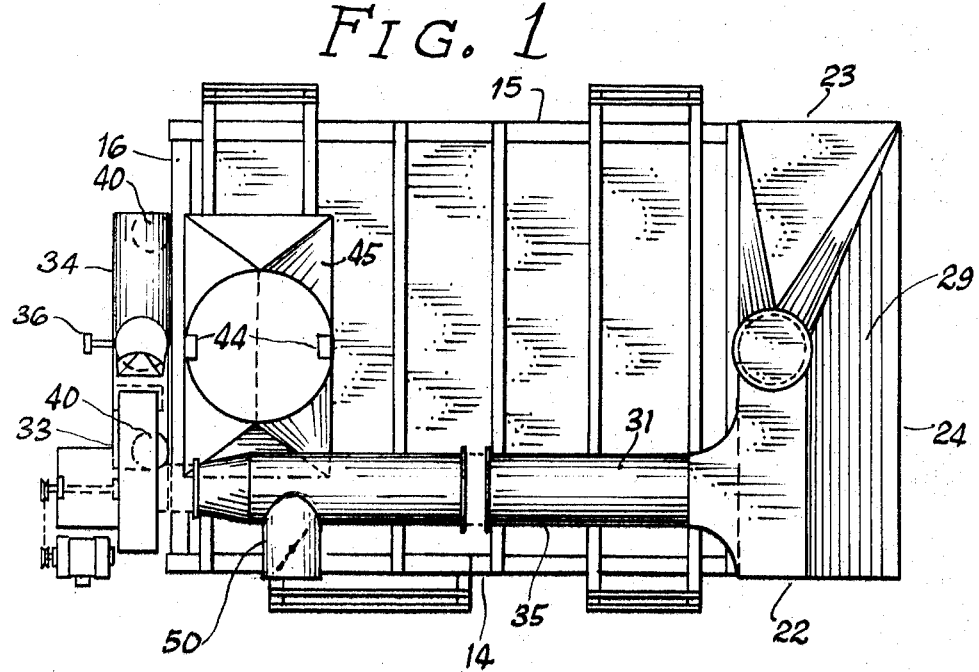
FIG. 1 is a plan view of an improved well-type melting furnace embodying the present invention.

This invention is susceptible of embodiment in many different forms. There is shown in the drawings and will be herein described in detail, however, a preferred embodiment of the invention. It should be understood that the descriptions contained herein are but an exemplification of the principles of the invention and are not intended to limit the scope of the invention to the embodiment illustrated and described.

Figure 2:
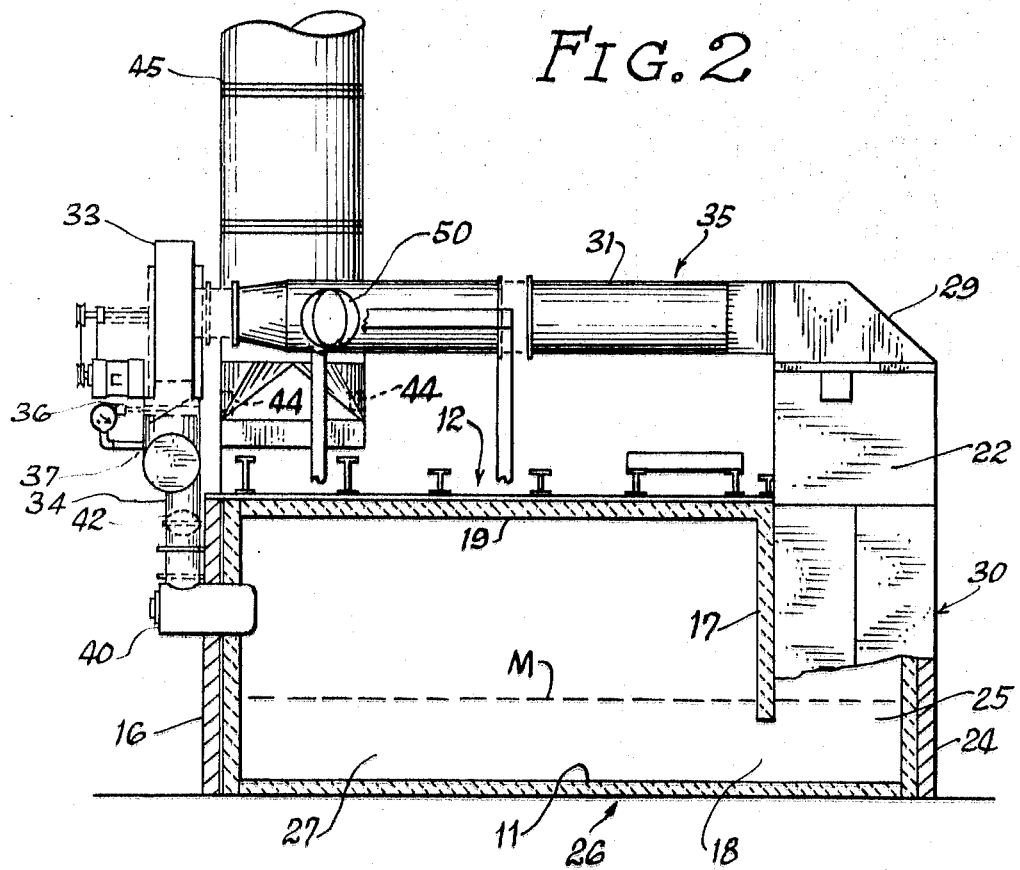
FIG. 2 is an elevational view of the furnace of FIG. 1, shown partially in cross-section to better illustrate certain portions thereof.

The furnace 10 illustrated in FIGS. 1 and 2 is a well-type furnace divided into a combustion and primary heating chamber 12, in which is mounted a pair of burners 40 supplied with gaseous fuel, and a vaporization chamber 30, both overlying a well 26 for the molten metal pool M. The well 26 actually is divided into a holding well 27, underlying the combustion chamber 12 and a material receiving and melting well 25 underlying the vaporization chamber 30. When contaminated raw material is supplied to the melting well 25 combustible fumes are developed in the vaporization chamber 30 and a duct system 35 feeds the fumes so developed to the burners 40 which burns these fumes, along with more typical gaseous flammable fuel to melt materials deposited within the furnace.

Structurally the furnace 10 has a bottom floor 11 of a generally rectangular configuration. At one side of the floor over a substantial portion thereof is the heating and combustion chamber 12 (FIG. 2). It is defined by front and rear walls 14 and 15 (FIG. 1) extending upwardly from respective front and rear edges of floor 11, and a first side wall 16 extending upwardly from one side of floor 11, all being of the same given height. A second side wall 17 has a plurality of openings 18 (only one (1) being shown) to provide communication between the receiving well and the holding well and to provide separation between the vaporization chamber 30 and combustion chamber 12. An upper covering wall 19 secured over the top edge of walls 14 through 17 serves to complete combustion chamber 12.

Respective opposite side wall portions 22 and 23 of side walls 14 and 15 also extend beyond wall 17 and upwardly from floor 11 to a height which is a fraction of that of chamber 12, and together with a third side wall 24 at the remaining side edge of floor 11, define receiving or depository well 25. This well is open at its upper edges to enable scrap metal to be deposited within the well for processing. Further this depository well 25 communicates through openings 18 with the holding and combustion chamber in the partition wall 17. The entire lower portion of the furnace 10 adjacent floor 11, wherein molten metal will be container (the level of which is represented by the broken line in FIG. 2), is the unitary well portion 26, which includes a main well 27 under combustion chamber 12, and the depository well 25.

A hood 29 is secured over scrap depository well 25 and completely encloses the opening of the wall to form the vaporization chamber 30. The chamber is equipped with doors (not shown) providing access to the well for feeding, stirring, etc. Hood 29 is part of the system of ducts 35, which includes a longitudinal tube 31 extending over upper covering wall 19 between chambers 25 and 30. At one end, tube 31 is connected to and communicates with hood 29, while at the other end, it is secured to a blower assembly 33 and communicates therewith. The blower assembly 33 is connected to a tube 34, which extends upwardly and transversely from the burners 40 to communicate with both the burners at the lower end, and with the blower assembly 33 at the upper end. The tube 34 carries a blower discharge damper 36 and an air valve 37 immediately below the blower 33, as well as individual dampers 42 for each of the burners for controlling the volume and air mixture of the fume input into the burners 40, thus completing the duct system 35.

The burners 40, of conventional design, are mounted within respective apertures in side walls 16 and extend therethrough into combustion chamber 12. They are supplied both with natural gas or other similar fuel in a conventional manner, through typical respective gas regulators and valves (not shown) and also with fumes from vaporization chamber 12, through the duct system 35. The combustion chamber 30 is also equipped with an exhaust stack 45, upper wall 19 being provided with a suitable aperture for affording communication between stack 45 and chamber 12.

The processing of the contaminated scrap is begun by initially depositing a predetermined amount of metal in either molten or solid state within well 26 and heating the metal to its melting temperature by operating burners 40 in the conventional manner with a natural gas or similar fuel. A pool of molten metal is thus established within main well 27 and depository well 25, flowing between the two chambers via apertures 18. Subsequently, contaminated scrap material and selected amounts of flux are initially fed into vaporization chamber 30. At the same time, the temperature within combustion chamber 12 is raised to a preselected level adequate to melt the metal constituents of the scrap, and to ignite any combustible or hydrocarbon constituents as well.

However, before the scrap is melted, it first must rest in depository well 25, whose temperature is generally lower than that of the main well 27, being established by conduction from the heated material in well 27 through apertures 18. Although the temperature is too low for the ignition of the combustibles because of combustible material and air ratio, it is at a high enough level to vaporize the combustible or hydrocarbon constituents of the scrap. At the same time, the metal constituents of the scrap become covered with molten flux, preventing oxidation of the metal, while the hood 29 is either supplied with ports, or is provided with large enough clearances so that vaporization chamber 25 is richly supplied with air. Blower 33 establishes a suction through tube 31, so that the result is a negative pressure within hood 29 and depository well 25 which prevents vaporized combustibles and other fumes from escaping. Also, because of the oxygen-rich atmosphere, at least a partial oxidation of the fumes is achieved as they are driven off of the scrap.

Meanwhile, the melting of the metal constituents proceeds with the aid of mixing of the mass in well 25 either manually or mechanically as disclosed in U.S. Pat. No. 3,703,340. Thus, the scrap originally placed in well 25 is melted and eventually finds its way into main well 26 through apertures 18. As the melting of the scrap continues, the fumes driven off the scrap into chamber 30 are forced into tube 31 by the negative pressure generated by blower 33. The blower then forces these fumes into tube 34 and the burners 40, where they are mixed with the normal natural gas fuel of the burners and then ignited within combustion chamber 12.

A large amount of air is drawn into the duct system 35 by the action of blower 33 so that all the air to support combustion within chamber 12 is normally supplied from vaporization chamber 30. Excessive amounts of air, such as for example might result during the initial start-up of the furnace, when the amount of scrap and degree of heat is still too low to generate much fume, may be compensated for by adjustment of air valve 37, or the amount of fuel supplied to burners 40 as may the converse condition of too little air because of an excessive amount of fume. Additional compensation may also be had to control the volumetric rate of flow of the total gaseous content through duct system 35 by adjustment of discharge damper 36. Also the flow into each respective one of burners 40 may be balanced by individual adjustment of dampers 42. Air valve 37 is powered by a motor which responds to a signal generated by a sensor 44 positioned below stack 45 to open and the close the valve automatically to maintain the proper fuel-air ratio and therefore oxygen level, for complete combustion of the fumes and gas.

If desired an additional motorized valve 50 connected to a source of air and controlled to maintain the temperature of the gaseous materials entering the blower 33 at a predetermined level.

After initial start-up, additional fuel and scrap is fed at a steady rate into well 25. If the scrap contains an adequate percentage of combustibles, fumes will be generated and channeled into combustion chamber 12 having a heat value such that their combustion will maintain the chamber 12 at the preselected temperature. The burner then acts merely as a pilot light to ignite the fumes, and the natural gas supply is reduced accordingly to a minimum. The temperature of the chamber 12 is then maintained quite readily near the preselected temperature by varying the feed rates of the scrap to prevent an excessive amount of fumes from being generated, while at the same time furnishing a sufficient volumetric rate of fumes to maintain the preselected temperature.

If the scrap contains lesser percentages of contaminants, so that not enough combustible fumes are generated to heat the chamber 12 to the fume-igniting preselected temperature when such scrap is fed at rates that may be accommodated by the furnace, the resultant temperature drop is monitored, and more gas is directed to the burners 40, at a volumetric rate which generally varies inversely to that of the production of the fumes, and in any case in sufficient quantity to maintain the temperature at the preselected level. Thus, in either case, a fuel mixture with heat producing potential adequate to yield the selected temperature is readily obtained, and all of the combustible contaminating components of the scrap are utilized as fuel by the burner. This reduces the amount of natural gas or equivalent outside fuel required by the burner to melt the scrap, as well as preventing wastage of the fumes from exhaust stack 45. At the same time, the exhaust which finally escapes through stack 45 is free of any combustible fumes, which no fumes are allowed to escape into the area around the furnace from chamber 30. In this manner, a significant savings due to lowered fuel gas consumption and the elimination of wastage of combustible fumes is achieved together with the substantial elimination of the release of combustible fumes into the atmosphere about the furnace.

I claim:

1. A method of re-claiming metals from metal-bearing scrap materials contaminated with combustibles which comprises the steps of:

feeding the scrap material into a well-type furnace having a combustion chamber over one portion of a well for melting the scrap material and a vaporization chamber over the remaining portion of said well;

heating said combustion chamber to a temperature sufficient to melt said scrap and form a molten metal pool in the well and vaporize said combustibles to produce combustible fumes in said vaporization chamber;

supplying oxygen to said vaporization chamber to accommodate substantially complete combustion of said fumes;

channeling said fumes and oxygen from said vaporization chamber into a burner secured within said combustion chamber; and igniting said fumes from said combustion chamber by said burner, thereby utilizing said fumes in melting said scrap in said well while substantially eliminating the exhaust of combustible fumes.

2. The method of claim 1 which includes the further step of supplying a gaseous flammable fuel to said burner for ignition with said combustible fumes to continuously maintain said ignition.

3. The method of claim 1 which includes the further step of supplying a gaseous flammable fuel to said burner for ignition with said combustible fumes at a volumetric rate varying generally inversely with that of the combustible fumes, but sufficient to maintain the combustion chamber at the ignition temperature of said fumes.

4. The method of claim 1 in which said scrap has sufficient combustibles to melt said scrap in the well and said feeding of said scrap is performed at a rate to produce the volumetric rate of fumes needed to maintain the combustion chamber at the ignition temperature of said fumes.

5. The method of claim 1 in which said oxygen supplying step is performed by permitting air to enter into said vaporization chamber.

6. The method of claim 1 in which said oxygen supplying step is performed at a rate regulated to insure the amount of oxygen needed for complete combustion of said fumes.

7. The method of claim 1 which includes the further step of supplying suction to said vaporization chamber through a duct communicating with said chamber and burner to insure the collection of said combustible fumes.

* * * * *